United States Patent
Schuhn et al.

(10) Patent No.: US 12,292,420 B2
(45) Date of Patent: May 6, 2025

(54) CONTROL OF SAMPLE SEPARATION BASED ON ANALYSIS OF MOBILE PHASE SUPPLY FROM MOBILE PHASE CONTAINER

(71) Applicant: Agilent Technologies, Inc., Santa Clara, CA (US)

(72) Inventors: Bettina Schuhn, Karlsruhe (DE); Uwe Effelsberg, Karlsruhe (DE); Manuel van Venrooy, Karlsruhe (DE); Matthias Kamuf, Bruchsal (DE)

(73) Assignee: Agilent Technologies, Inc., Santa Clara, CA (US)

( * ) Notice: Subject to any disclaimer, the term of this patent is extended or adjusted under 35 U.S.C. 154(b) by 388 days.

(21) Appl. No.: 17/736,868

(22) Filed: May 4, 2022

(65) Prior Publication Data

US 2022/0365042 A1   Nov. 17, 2022

(30) Foreign Application Priority Data

May 12, 2021   (GB) ..................................... 2106761

(51) Int. Cl.
| | |
|---|---|
| *G01N 30/02* | (2006.01) |
| *G01N 30/32* | (2006.01) |
| *G01N 30/38* | (2006.01) |

(52) U.S. Cl.
CPC ....... *G01N 30/02* (2013.01); *G01N 2030/027* (2013.01); *G01N 2030/326* (2013.01); *G01N 2030/387* (2013.01)

(58) Field of Classification Search
CPC ................ F16C 19/381; F16C 2233/00; F16C 2360/31; F16C 41/007; F16C 43/04; G01D 11/02; G01D 5/202; G01P 3/443
See application file for complete search history.

(56) References Cited

U.S. PATENT DOCUMENTS

| | | | | |
|---|---|---|---|---|
| 7,914,741 B2 * | 3/2011 | Williams | ................ | G01N 33/15 422/65 |
| 7,938,032 B2 * | 5/2011 | Fernando | .............. | B01F 33/813 73/866 |

(Continued)

FOREIGN PATENT DOCUMENTS

| | | | | | |
|---|---|---|---|---|---|
| CN | 202734898 U | * | 2/2013 | ............. | G01F 22/00 |
| CN | 206274274 U | * | 6/2017 | ............. | G01G 17/04 |

(Continued)

OTHER PUBLICATIONS

Combined Search and Examination Report under Sections 17 and 18(3) dated Oct. 21, 2021 for application GB2106761.6; 7 pages.

(Continued)

*Primary Examiner* — David L Singer

(57) ABSTRACT

A method of controlling a sample separation apparatus, for separating a fluidic sample using a mobile phase provided from at least one mobile phase container, includes determining a weight and volume reduction behavior according to which weight and volume of mobile phase in a mobile phase container are reduced during conveying mobile phase from the mobile phase container in the sample separation apparatus, and determining a tare weight of the mobile phase container based on a gross weight information, a volume information, and the determined weight and volume reduction behavior. The gross weight information is indicative of an initial gross weight of the mobile phase container including its mobile phase, and the volume information is indicative of an initial mobile phase volume in the mobile phase container.

17 Claims, 4 Drawing Sheets

(56) References Cited

U.S. PATENT DOCUMENTS

| | | |
|---|---|---|
| 2009/0139451 A1 | 6/2009 | Skordas |
| 2019/0257731 A1 | 8/2019 | Isoi |
| 2020/0056606 A1* | 2/2020 | Yokoi .................. F04B 49/106 |
| 2020/0088695 A1 | 3/2020 | Shreve et al. |
| 2020/0264139 A1 | 8/2020 | Isoi |
| 2021/0080436 A1* | 3/2021 | Koga ..................... G01N 30/34 |
| 2021/0356445 A1* | 11/2021 | Yoshida ............. G01N 30/8631 |
| 2022/0244091 A1* | 8/2022 | Sano ...................... G01G 23/00 |
| 2023/0011515 A1* | 1/2023 | Shibata .................. G01N 30/26 |

FOREIGN PATENT DOCUMENTS

| | | | |
|---|---|---|---|
| EP | 1577012 A1 | 9/2005 | |
| EP | 1589336 A1 | 10/2005 | |
| EP | 2244091 A1 | 10/2010 | |
| JP | H1123549 A | 1/1999 | |
| JP | 2015059895 A | 3/2015 | |
| JP | 7310928 B2 * | 7/2023 | ............ G01N 30/26 |
| WO | WO-2019058433 A1 * | 3/2019 | ............ G01N 30/26 |
| WO | 2020148853 A1 | 7/2020 | |
| WO | WO-2020183563 A1 * | 9/2020 | ............ G01N 30/26 |
| WO | WO-2020183564 A1 * | 9/2020 | ............ G01N 30/26 |

OTHER PUBLICATIONS

UK Intellectual Property Office Search Report under Section 17(6) dated May 23, 2022 for Application No. GB2106761.6; 2 pages.

UK Intellectual Property Office Combined Search and Examination Report under Sections 17 and 18(3) dated May 13, 2024 or Application GB 2312602.2; 5 pages.

UK Intellectual Property Office Combined Search and Examination Report under Sections 17 and 18(3) dated Dec. 11, 2023 for Application No. GB2308495.7; 4 pages.

* cited by examiner

CONTROL OF SAMPLE SEPARATION BASED ON ANALYSIS OF MOBILE PHASE SUPPLY FROM MOBILE PHASE CONTAINER

RELATED APPLICATIONS

This application claims priority to UK Application No. 2106761.6, filed May 12, 2021, the entire contents of which are incorporated herein by reference.

TECHNICAL FIELD

The present invention relates to methods, control devices, and a sample separation apparatus.

BACKGROUND

In liquid chromatography, a fluidic analyte may be pumped through a column comprising a material which is capable of separating different components of the fluidic analyte. Such a material, a so-called stationary phase, may be filled into a column tube which may be connected to other elements (like a control device, containers including sample and/or buffers). Upstream of a column, the fluidic sample or analyte is loaded into the liquid chromatography apparatus. A controller controls an amount of fluid to be pumped through the liquid chromatography apparatus, including controlling a composition and time-dependency of a solvent interacting with the fluidic analyte. Such a solvent may also be a mixture of different constituents, and may be denoted as mobile phase.

Proper supply of mobile phase to a sample separation apparatus is of utmost importance for the accuracy and reproducibility of separation results.

SUMMARY

It is an object of the invention to supply a mobile phase to a sample separation apparatus to ensure accurate and reproducible sample separation.

According to an exemplary embodiment of a first aspect of the invention, a method of controlling a sample separation apparatus for separating a fluidic sample using a mobile phase provided from at least one mobile phase container is provided, wherein the method comprises determining a weight and volume reduction behavior according to which weight and volume of mobile phase in a mobile phase container are reduced during conveying mobile phase from the mobile phase container in the sample separation apparatus, and determining a tare weight of the mobile phase container based on a gross weight information, a volume information, and the determined weight and volume reduction behavior, wherein the gross weight information is indicative of an initial gross weight of the mobile phase container including its mobile phase and the volume information is indicative of an initial mobile phase volume in the mobile phase container.

According to another exemplary embodiment of the first aspect of the invention, a control device (which may comprise a processor) for controlling a sample separation apparatus for separating a fluidic sample using a mobile phase provided from at least one mobile phase container is provided, wherein the control device comprises an input unit for inputting (for example providing, receiving, determining or deriving) gross weight information indicative of an initial gross weight of a mobile phase container including its mobile phase and volume information indicative of an initial mobile phase volume in the mobile phase container, a reduction behavior determining unit for determining a weight and volume reduction behavior according to which weight and volume of mobile phase in the mobile phase container are reduced during conveying mobile phase from the mobile phase container in the sample separation apparatus, and a tare weight determining unit for determining a tare weight of the mobile phase container based on the gross weight information, the volume information, and the determined weight and volume reduction behavior.

According to an exemplary embodiment of a second aspect of the invention, a method of controlling a sample separation apparatus for separating a fluidic sample using a mobile phase is provided, wherein the method comprises measuring, at a mobile phase container providing the mobile phase, actual measurement information indicative of conveyance of the mobile phase out of the mobile phase container during operating the sample separation apparatus, determining, based on at least one operation parameter of operating the sample separation apparatus, actual operation information indicative of conveyance of the mobile phase by a fluid drive during operating the sample separation apparatus, and comparing the actual measurement information and the actual operation information for deriving a conclusion.

According to another exemplary embodiment of the second aspect of the invention, a control device (which may comprise a processor) for controlling a sample separation apparatus for separating a fluidic sample using a mobile phase is provided, wherein the control device comprises a measuring unit for measuring, at a mobile phase container providing the mobile phase, actual measurement information indicative of conveyance of the mobile phase out of the mobile phase container during operating the sample separation apparatus, a determining unit for determining, based on at least one operation parameter of operating the sample separation apparatus, actual operation information indicative of conveyance of the mobile phase by a fluid drive during operating the sample separation apparatus, and a comparison unit for comparing the actual measurement information and the actual operation information for deriving a conclusion.

According to another exemplary embodiment which may relate to any of the first aspect and/or the second aspect, a sample separation apparatus for separating a fluidic sample is provided, wherein the sample separation apparatus comprises a fluid drive for driving a mobile phase, provided from at least one mobile phase container, and the fluidic sample when injected in the mobile phase, a sample separation unit for separating the fluidic sample in the mobile phase, and a control device configured for carrying out or controlling a method having any of the above-mentioned features and/or configured according to the above-mentioned features for controlling the sample separation apparatus.

In the context of the present application, the term "sample separation apparatus" may particularly denote any apparatus which involves the transport, analysis or processing of fluids for separation of a fluidic sample. A fluid may denote a liquid, a gas or a combination of a liquid and a gas, and may optionally also include solid particles, for instance forming a gel or an emulsion. Such a fluid may comprise a mobile phase (such as a fluidic solvent or solvent composition) and/or a fluidic sample under analysis. Examples for sample separation apparatuses are chemical analysis devices, life science apparatuses or any other biochemical analysis system such as a separation device for separating different components of a sample, particularly a liquid chromatography device. For example, the sample separation can be done by chromatography or electrophoresis.

In the context of the present application, the term "fluidic sample" may particularly denote a medium containing the matter which is actually analyzed (for example a biological sample, such as a protein solution, a pharmaceutical sample, etc.).

In the context of the present application, the term "mobile phase" may particularly denote a fluid (in particular a liquid) which serves as a carrier medium for transporting a fluidic sample between a fluid drive (such as a high pressure pump) and a sample separation unit (such as a chromatographic column) of a sample separation apparatus. For example, the mobile phase may be a (for example, organic and/or inorganic) solvent or a solvent composition (for example, water and ethanol).

In the context of the present application, the term "mobile phase container" may particularly denote any reservoir or accommodation device accommodating a certain amount of mobile phase. For example, such a mobile phase container may be a bottle containing mobile phase and being fluidically coupled or couplable to other components of the sample separation apparatus by fluidic conduits, such as tubing or capillaries. The mentioned bottle may be closed by a cap. A fluid filter may be provided in the bottle or in a conduit for filtering debris and solid particles out of the mobile phase.

In the context of the present application, the term "fluid drive" may particularly denote an entity capable of driving a fluid (i.e. a liquid and/or a gas, optionally comprising solid particles), in particular the fluidic sample and/or the mobile phase. For instance, the fluid drive may be a pump (for instance embodied as piston pump or peristaltic pump) or another source of pressure. For instance, the fluid drive unit may be a high-pressure pump, for example capable of driving a fluid with a pressure of at least 100 bar, in particular at least 1000 bar.

In the context of the present application, the term "sample separation unit" may particularly denote a fluidic member through which a fluidic sample is transferred, and which is configured so that, upon conducting the fluidic sample through the separation unit, the fluidic sample will be separated into different groups of molecules or particles. An example for a separation unit is a liquid chromatography column which is capable of trapping or retarding and selectively releasing different fractions of the fluidic sample. In particular, a sample separation unit may be a tubular body with an aspect ratio (i.e. a ratio between length and diameter) of more than one, in particular of more than two, for instance even at least three. For instance, a length of a sample separation unit may be in a range from 80 mm to 300 mm, for example 100 mm.

In the context of the present application, the term "gross weight information indicative of an initial gross weight of a mobile phase container" may particularly denote data providing an indication of an overall weight of a mobile phase container plus a weight of mobile phase contained in the mobile phase container. The gross weight information may be directly the mentioned gross weight or a parameter value being proportional to the gross weight or allowing to derive the gross weight. The initial gross weight of a mobile phase container may be a gross weight at a certain point of time from which onwards a fluid supply or a separation task starts during which mobile phase from the mobile phase container is used or consumed.

In the context of the present application, the term "volume information indicative of an initial mobile phase volume in a mobile phase container" may particularly denote data providing an indication of a fluid volume of mobile phase contained in the mobile phase container. The volume information may be directly the mentioned fluid volume or a parameter value being proportional to the volume or allowing to derive the volume being presently contained in the mobile phase container. The initial volume of a mobile phase in a mobile phase container may be a fluid volume at a certain point of time from which onwards a fluid supply or a separation task starts during which mobile phase from the mobile phase container is used or consumed.

In the context of the present application, the term "weight and volume reduction behavior according to which weight and volume of mobile phase in the mobile phase container are reduced" may particularly denote a time dependency according to which a weight of mobile phase in a mobile phase container and a volume of this mobile phase in this mobile phase container change over time when, from a certain initial point of time onwards, a fluid supply or a separation task starts during which mobile phase from the mobile phase container is used or consumed. The weight and volume reduction behaviour may be indicated for instance by a plurality of data pairs of weight and volume of remaining mobile phase in the mobile phase container at different points of time after the initial point of time in view of the use or consumption of mobile phase, may be a gradient of a volume-over-weight diagram, or may be any other quantitative indicator of a weight and volume reduction of mobile phase in the mobile phase container over time.

In the context of the present application, the term "tare weight of a mobile phase container" may particularly denote the weight of the mobile phase container in an empty state, i.e. when no mobile phase is contained any more in the mobile phase container.

In the context of the present application, the term "measuring actual measurement information indicative of conveyance of mobile phase during operating a sample separation apparatus" may particularly denote a physical real world measurement of one or more parameters describing an attribute and/or an amount (such as a mass and/or a volume) of mobile phase which is driven out of a mobile phase container through the sample separation apparatus. For instance, such measurement may be made by a weighing device measuring a weight-over-time behaviour of the conveyed mobile phase directly or indirectly, for instance by placing the mobile phase container with the successively consumed mobile phase therein on the weighing device and detecting weight data over a period of time during which a mobile phase is supplied or a sample separation task is executed. As an alternative to a weighing device, the actual measurement information may also be measured in another way at the one or more mobile phase containers, for instance by optically detecting a fluid level of the mobile phase in a mobile phase container over time. The determined actual measurement information indicates an actual behaviour of the mobile phase rather than a target behaviour thereof, and is correlated to an amount of mobile phase flowing out of the mobile phase container.

In the context of the present application, the term "determining actual operation information indicative of conveyance of the mobile phase during operating the sample separation apparatus" may particularly denote another physical real world determination of information describing an attribute and/or an amount (such as a mass and/or a volume) of mobile phase which is actually driven by a fluid drive through the sample separation apparatus. The sample separation apparatus, and in particular that the fluid drive, may be driven in accordance with one or more operation parameters. Determination of the actual operation information may use as a basis actual (for instance measured) values of one or more operation parameters (such as an actual flow rate of the mobile phase originating from the mobile phase container and driven by the fluid drive, which may be measured by a flow rate sensor; and/or an actual pressure of the mobile phase pumped or driven from the mobile phase container by the fluid drive, which may be measured by a pressure sensor, etc.) measured during conveying or driving mobile phase from the mobile phase container through the sample separation apparatus by the fluid drive. The determined actual operation information indicates an actual behaviour of the mobile phase rather than a target behaviour thereof, and is correlated to an amount of mobile phase which is actually driven by the fluid drive.

In the context of the present application, the term "deriving a conclusion" may particularly denote determining information or taking an action in dependence of a result of a comparison of the actual measurement information with the actual operation information. For example, such a conclusion may be whether or not at least one mobile phase container containing mobile phase is appropriate for carrying out a certain sample separation task, for instance is capable of providing a sufficient amount of the certain mobile phase. In case of a significant discrepancy (for instance beyond a predefined threshold value) between the actual measurement information and the actual operation information, an action to be taken as a derived conclusion may be the output of a warning to a user, the termination of an already running sample separation run, or refusing to start a sample separation run. In case of an only insignificant discrepancy (for instance below a predefined threshold value) between the actual measurement information and the actual operation information, or even a compliance between actual measurement information and actual operation information, a conclusion may be to allow the start or continuation of a sample separation run. A conclusion may also be the determination of a performance indicator of the sample separation apparatus, in particular indicating whether or not the operation of the sample separation apparatus meets a quality criterion or not.

According to an exemplary embodiment of the first aspect of the invention, a tare weight of a mobile phase container containing mobile phase to be used during separation of a fluidic sample by a sample separation apparatus (such as a liquid chromatography device) may be determined in a very simple, efficient and precise way. This determination may be based on an initial gross weight of mobile phase container including mobile phase, which can be simply measured for example by a weighing device. Furthermore, the determination may use an initial mobile phase volume in the mobile phase container, which may for instance be provided by a user or determined in a self-sufficient way by the control device. As a third item of information, weight and volume reduction over time can be determined for the mobile phase in the mobile phase container, i.e. a volume and a weight of mobile phase flowing out of the mobile phase container during operating a sample separation apparatus. For example, the weight reduction may be measured by a weighing device, while the volume change may be detected by a volumetric flow rate sensor or the like. When the mentioned elements of information have been determined, the tare weight of the completely emptied mobile phase container may be determined, for example by extrapolating the weight and volume reduction behavior over time using the initial gross weight and the initial mobile phase volume as a starting point. The tare weight of a mobile phase container may be a highly useful parameter for accurately controlling operation of a sample separation apparatus, since it may allow to carry out a precise mobile phase management during executing a sample separation task or the like using one or more mobile phase containers. The mentioned mechanism of determining the tare weight of a mobile phase container may render it dispensable that a user manually determines the tare weight of a mobile phase container which involves a danger for a user handling chemically aggressive mobile phase, a high effort for a user, a risk of inaccuracy of the determined tare weight, and a risk of contamination of contaminated mobile phase introduced into the sample separation apparatus. In contrast to this, a semi-automatic or fully-automatic tare weight determination according to an exemplary embodiment may allow to supply mobile phase to the sample separation apparatus to ensure accurate and reproducible sample separation.

According to an exemplary embodiment of the second aspect of the invention, two complementary determination processes are carried out for determining actual information how mobile phase is driven through a sample separation apparatus, for instance in terms of a sample separation run for separating a fluidic sample. On the one hand, actual measurement information may be determined, i.e. a physical measurement in the real world can be carried out on the sample separation apparatus for determining experimental information concerning the conveying of mobile phase from a mobile phase container through the sample separation apparatus. For example, a mobile phase container containing mobile phase and used as a reservoir for the mobile phase conveyed through the sample separation apparatus may be placed on a weighing device, so that a weight information over time may be determined as actual measurement information while mobile phase flows out of the mobile phase container and into the sample separation apparatus. At least partly simultaneously, an actual value and/or time dependence of one or more operation parameters (such as flow rate or pressure of the mobile phase) may be determined in the sample separation apparatus, which may indicate mobile phase consumption by a fluid drive driving the mobile phase from the mobile phase container. In the absence of any issues, problems or artefacts—such as a micro leakage of mobile phase in the sample separation apparatus—both actual (rather than target) items of information should be in compliance. A discrepancy between the two actually determined items of information may be an indicator for an issue, problem or artifact. Highly advantageously, two actually determined real world values may be compared according to exemplary embodiments of the invention, rather than comparing an actual value with a target value. Hence, a derived conclusion does not focus on theoretical assumptions or a desired target behavior of the sample separation apparatus only, but in contrast with this on its actual or real behavior. This renders the results of the comparison particularly meaningful. Such a concept of comparing actual measurement information—which may be linked to a measured amount of mobile phase actually leaving a mobile phase container—with actual operation information—which may be linked to an amount of mobile phase actually conveyed by a fluid drive operated in accordance with certain operation parameters—may allow to precisely monitor mobile phase supply from two complementary perspectives. This may allow to provide mobile phase to the sample separation apparatus to ensure accurate and reproducible sample separation.

Next, further exemplary embodiments of the methods, the control devices, and the sample separation apparatus will be explained.

Exemplary embodiments according to the first aspect and the second aspect of the invention may be carried out separately, or in combination.

In an embodiment, the method comprises and the control device is configured for controlling the sample separation apparatus based on a result of the determining, in particular using the determined tare weight as a basis for the control. The determined tare weight of the mobile phase container may provide an indication of available mobile phase resources which can be used by a control device for precisely controlling a sample separation task, since this knowledge allows a precise and reliable management of the mobile phase consumption during sample separation.

In an embodiment, the method comprises and the control device is configured for measuring the gross weight information and/or the weight reduction behavior, in particular by a weighing machine. For this purpose, it may be sufficient that the user simply places a mobile phase container on a dedicated surface of the sample separation apparatus, wherein a weighing machine may be arranged at or below said surface. In another embodiment, a weight scale may also have a hanging configuration. When the gross weight of the mobile phase container including mobile phase therein and/or a change of weight over time during carrying out a sample separation task or the like is measured by a corresponding weight detector or sensor, it may be dispensable for a user to determine a gross weight of the mobile phase container. Hence, the control based on the determined tare weight may be automated, which may render operation of the sample separation apparatus user-friendly, objective and accurate.

In an additional or alternative embodiment, the method comprises and the control device is configured for receiving the gross weight information from a user input. For instance, a user may measure, determine or derive the gross weight and may input it via a user interface.

In another additional alternative embodiment, the method comprises and the control device is configured for determining the gross weight information based on at least one of an assumption, an experience, and a previous measurement. For example, an educated guess may be made which mobile phase container is presently used (for instance in the way as described referring to FIG. 5), so that a pre-known gross weight of such a mobile phase container can be used as a basis for the determination of the tare weight.

In view of the foregoing, the gross weight information does not necessarily have to be provided (for example by a user), but it may also be determined, for example based on an assumption or experience (for instance that a certain bottle is used) or based on previous measurements. Hence, the gross weight information can be derived, determined and/or provided according to one or more of the mentioned options (such as based on an assumption or derived from experience or previous measurements).

In an embodiment, the method comprises and the control device is configured for receiving the initial mobile phase volume from a user input. For instance, when a user puts a new mobile phase container including mobile phase on a dedicated surface of the sample separation apparatus, it is a simple task for a user to input the mobile phase volume, which is usually indicated on a label of such a mobile phase container, to the system as a basis for determining the tare weight. A corresponding approach may be applicable when the mobile phase container used by a user for a sample separation task is no longer completely filled, since mobile phase containers can be equipped with a scale allowing to read a remaining mobile phase volume by simply looking at the mobile phase level in the mobile phase container using said scale.

In an alternative embodiment, the method comprises and the control device is configured for determining the initial mobile phase volume based on a comparison of a weight and volume characteristic of the mobile phase container with a pre-known reference weight and volume characteristic of one or more reference mobile phase containers with pre-known initial mobile phase volume. Such an approach is illustrated below for example referring to FIG. 5. In a volume-over-weight diagram, each type of mobile phase container being emptied partially or entirely during operation of a sample separation apparatus may show a characteristic behavior, depending on properties such as an initial gross weight, an initial mobile phase volume, a tare weight, a density of the mobile phase, etc. When a system is provided with predetermined information concerning a characteristic behavior of different types of mobile phase containers in a volume-over-weight diagram, and a comparison of such a characteristic behavior with a volume-over-weight behavior of an unknown mobile phase container is carried out, a best match may be determined which allows to identify the previously unknown mobile phase container. A user input in terms of initial mobile phase volume of the mobile phase container may then be dispensable, which may render the system even more user-friendly and accurate.

In an embodiment, the method comprises and the control device is configured for identifying the mobile phase container based on a comparison of a weight and volume characteristic of the mobile phase container with a pre-known reference weight and volume characteristic of one or more reference mobile phase containers with pre-known identity. With a corresponding approach as the one described in the preceding paragraph, not only a determination of an initial mobile phase volume may be carried out, but it may also be possible to identify which type of mobile phase container (for instance containing which mobile phase, having which initial mobile phase volume, having which gross weight, etc.) is presently used by a user. This allows to further simplify the operation of the system and render it even more user-friendly.

In an embodiment, the method comprises and the control device is configured for identifying the mobile phase based on a comparison of the determined weight and volume reduction behavior with pre-known reference weight and volume reduction behavior of one or more reference mobile phase materials with pre-known identity. Descriptively speaking, a gradient of a (in particular linear) volume-over-weight characteristic may correspond to the density of a certain mobile phase. The lower the density of the mobile phase in a mobile phase container, the steeper will be the volume-over-weight characteristic. By analyzing the gradient behavior, an identification of the type of mobile phase (for instance methanol, acetonitrile, etc.) in an unknown mobile phase container may be possible in an automated and user-friendly way.

In an embodiment, the method comprises and the control device is configured for determining the tare weight by extrapolating the weight and volume reduction behavior starting from the initial gross weight and the initial mobile phase volume, in particular up to a zero volume of mobile phase in the mobile phase container. Thus, the (in particular linear) determined weight and volume reduction behavior may be extrapolated until it intersects with the weight axis of a volume-over-weight diagram.

In an embodiment the method comprises and the control device is configured for predicting, based on the provided gross weight information, the provided volume information, and the determined weight and volume reduction behavior, a point of time at which a remaining amount of mobile phase in the mobile phase container falls below a predefined threshold value, in particular a predefined threshold value in a range from 5% to 20% of an initial amount of mobile phase in the mobile phase container. Advantageously, a prediction of the expected time dependence of a level of remaining mobile phase in the mobile phase container may not or may not only estimate a future point of time when the mobile phase container will be completely empty, but may estimate when a remaining alert level (for instance a 10% filling level) will be reached at which the mobile phase container should be refilled or substituted by a filled mobile phase container to avoid that the system runs out of mobile phase and thereby runs dry during execution of a separation run.

In an embodiment, the method comprises and the control device is configured for predicting, based on the provided gross weight information, the provided volume information, and the determined weight and volume reduction behavior, whether the mobile phase in the mobile phase container is sufficient for carrying out a predefined separation run for separating the fluidic sample by the sample separation apparatus. A predefined sample separation task may be defined by a set of operation parameters (for instance a column temperature, a mobile phase pressure, etc.) and operation commands (for example a gradient profile of a solvent composition of different mobile phases, such as water and an organic solvent, which shall be adjusted in accordance with a sample separation task). Such a set of operation parameters and operation commands may be denoted as a separation method, in particular as chromatographic sample separation method. On the basis of the provided and determined data as well as under consideration of operation parameters and operation commands of a separation method, a calculation may be carried out for assessing whether or not the remaining mobile phase in the mobile phase container—or preferably a plurality of different mobile phases in a plurality of mobile phase containers in combination—is or are sufficient for completing a corresponding sample separation task or sample separation run.

In an embodiment, the method comprises and the control device is configured for taking an action in accordance with a result of the prediction. Thus, depending on the results of the prediction, the control device or the sample separation apparatus may proceed with its operation in an assigned, for instance predefined, way. For instance, a user may be invited to provide additional mobile phase (for instance to add at least additional 100 mL) sufficient for completing the predefined separation run. Thus, if the prediction concludes that the remaining mobile phase in a respective mobile phase container is insufficient for completing a sample separation task, the system may output this to a user so that the user can add necessary additional mobile phase. In another embodiment, the taken action may be the output of a warning to the user that the provided mobile phase is or might be insufficient for completing the predefined separation run. Correspondingly, the user may decide on his own how to tackle this situation. In yet another embodiment, the taken action may be to stop the separation run upon predicting that remaining mobile phase is insufficient for completing the predefined separation run. By taking this measure, it may be reliably ensured that the sample separation apparatus does not run out of mobile phase during executing an intended sample separation run, so that neither the sample separation apparatus nor the sample to be separated will be damaged or destroyed or that an unusable separation result is obtained. If the sample separation task has not yet started, the taken action may be to disable execution of the predefined separation run, even if started by a user, until sufficient mobile phase for completing the predefined separation run has been provided. Hence, approval of the execution of a separation run may be postponed until sufficient solvent for the separation run is available. This prevents the user from starting a separation run which has no chance of delivering a reliable separation result or to provide sufficient operational safety. It is also possible that the system checks during a separation run whether mobile phase shall be refilled, for example when a sample list indicating a number of fluidic samples to be separated is extended by a user during a separation run. For instance, a weighing device may carry out a weighing measurement regularly (for instance once a minute) to measure information indicative of a remaining amount of mobile phase in the respective mobile phase containers.

In an embodiment, the method comprises and the control device is configured for determining a density of the mobile phase based on the determined weight and volume reduction behavior, in particular from a gradient of the determined weight and volume reduction behavior. Descriptively speaking, density of the mobile phase may correspond to a gradient in the volume-over-weight curve. Hence, density of the mobile phase and therefore its identity may also be determined in an automated way so as to further refine the control of a separation task. For instance, density determination concerning mobile phase in a mobile phase container may be determined automatically by a system in order to compare a corresponding mobile phase type with a mobile phase type input by a user. In case of a discrepancy, the system may output a warning.

In an embodiment, the method comprises and the control device is configured for determining the weight and volume reduction behavior under consideration of a flow rate (which may be a volumetric flow rate, i.e. flowing mobile phase volume per time interval, and/or a mass flow rate, i.e. flowing mobile phase mass per time interval) and a conveyance time (i.e. a time interval over which mobile phase flows along a flow path of the sample separation apparatus) according to which the mobile phase is driven from the at least one mobile phase container through the sample separation apparatus, in particular by a fluid drive. If the mentioned parameters are known, the weight and volume reduction behavior may be precisely estimated or calculated.

In an embodiment, the method comprises and the control device is configured for determining the weight and volume reduction behavior under consideration of a repeated measurement of the gross weight information and/or the weight reduction behavior, in particular by a weighing machine. With each repeated measurement, a further data point in a volume-over-weight curve may be obtained, so that the behavior may be further refined. For instance, the remaining gross weight of the successively emptied mobile phase container may be measured at equally spaced points of time (for instance once every 10 seconds or once a minute), or even continuously.

In an embodiment, the method comprises and the control device is configured for using the mobile phase from the at least one mobile phase container as carrier fluid for carrying the fluidic sample during sample separation. For example, a first mobile phase (for instance water) from one mobile phase container may be mixed with a second mobile phase (for instance an organic solvent such as methanol) from another mobile phase container for creating a solvent composition with constant or varying ratio of the first and second mobile phases. Such a solvent composition-type mobile phase may be used for carrying along the fluidic sample from an injector to a sample separation unit such as a chromatographic column. The fluidic sample may then be adsorbed at the sample separation unit. By changing composition of the solvent composition-type mobile phase over time (in particular in accordance with a predefined gradient profile), individual fractions of the fluidic sample may then be desorbed fraction-wise, so that the individual fractions may be individually detected. The latter principle may be denoted as gradient mode. A sample separation with a mobile phase having a solvent composition which is constant over time may be denoted as isocratic mode and can be carried out in alternative embodiments as well.

In an embodiment, the method comprises and the control device is configured for measuring the actual measurement information by measuring over time a weight of the mobile phase container and mobile phase therein. For this purpose, a weighing machine may be implemented on which the mobile phase container(s) is or are placed. Without any additional effort, this allows to measure easily and precisely over time the weight of the mobile phase container being successively emptied from mobile phase contained therein.

In an embodiment, the method comprises and the control device is configured for using flow rate (which may be a volumetric flow rate, i.e. flowing mobile phase volume per time interval, and/or a mass flow rate, i.e. flowing mobile phase mass per time interval) and conveyance time (i.e. a time interval over which mobile phase flows along a flow path of the sample separation apparatus) according to which the mobile phase is driven from the at least one mobile phase container through the sample separation apparatus as operation parameters for determining the actual operation information. The determination of the two mentioned parameters may allow to precisely determine which amount of mobile phase from the mobile phase container is in fact pumped by the fluid drive along a flow path of the sample separation apparatus.

In an embodiment, the method comprises and the control device is configured for deriving as conclusion that the sample separation apparatus, in particular a fluid drive (such as a high-pressure analytical pump) of the sample separation apparatus for driving the mobile phase, has an issue, in particular a leakage issue, in case of a discrepancy between the mobile phase container-related actual measurement information and the fluid drive-related actual operation information. For instance, micro leakages cannot be detected easily. However, by comparing two actual (rather than target) parameters which are based on actual experimental conditions during operation of a sample separation apparatus, discrepancies between the two items of information may allow to identify and even quantify such a micro leakage.

In an embodiment, the method comprises and the control device is configured for deriving as conclusion an actual value of the at least one operation parameter by analyzing a discrepancy between the actual measurement information and the actual operation information (for example by bringing the actual measurement information in accordance with the actual operation information). If for instance an amount of mobile phase consumed by the sample separation apparatus as indicated by the measured actual measurement information deviates from said amount as indicated by the determined evaluation of one or more operation parameters, it may be concluded that a certain amount of mobile phase from the mobile phase container is lost on its way through the sample separation apparatus (for instance due to leakage). This fact, as indicated by the amount of a discrepancy between the two values, may be taken into account for the controller of the sample separation apparatus. For instance, a lost amount of mobile phase may be added additionally for compensating said discrepancy.

In an embodiment, the method comprises and the control device is configured for deriving as conclusion whether or not the sample separation apparatus complies with a predefined specification by analyzing a discrepancy between the actual measurement information and the actual operation information. For example, an amount of a discrepancy between an amount of mobile phase consumed by the sample separation apparatus as indicated by the measured actual measurement information and said amount as indicated by the determined evaluation of one or more operation parameters may be compared with a maximum discrepancy allowed by a predefined specification. If the discrepancy does not exceed the maximum value according to the predefined specification, compliance with the specification may be concluded. If however the discrepancy exceeds said maximum value, non-compliance with the specification may be concluded. By taking this measure, a performance indicator may be determined for characterizing the performance of the sample separation apparatus.

Embodiments may be implemented in conventionally available HPLC systems, such as the analytical Agilent 1290 Infinity II LC system or the Agilent 1290 Infinity II Preparative LC/MSD system (both provided by the applicant Agilent Technologies—see www.agilent.com).

One embodiment of a sample separation apparatus comprises, as fluid drive, a pump having a pump piston for reciprocation in a pump working chamber to compress liquid in the pump working chamber to a high pressure at which compressibility of the liquid becomes noticeable. This pump may be configured to know (by means of operator's input, notification from another module of the instrument or similar) or elsewise derive solvent properties.

The sample separation unit of the sample separation apparatus preferably comprises a chromatographic column (see for instance en.wikipedia.org/wiki/Column_chromatography) providing a stationary phase. The column may be a glass or steel tube (for instance with a diameter from 50 μm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to adjust the retention of the compounds of interest and/or the amount of mobile phase to run the chromatography. The mobile phase can also be chosen so that the different compounds or fractions of the fluidic sample can be separated efficiently. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

A fluidic sample analyzed by a sample separation apparatus according to an exemplary embodiment of the invention may comprise but is not limited to any type of process liquid, natural sample like juice, body fluids like plasma or it may be the result of a reaction like from a fermentation broth.

The pressure, as generated by the fluid drive, in the mobile phase may range from 2-200 MPa (20 to 2000 bar), in particular 10-150 MPa (150 to 1500 bar), and more particularly 50-120 MPa (500 to 1200 bar).

The sample separation apparatus, for instance an HPLC system, may further comprise a detector for detecting separated compounds of the fluidic sample, a fractionating unit for outputting separated compounds of the fluidic sample, or any combination thereof. For example, a fluorescence detector may be implemented.

Embodiments of the invention can be partly or entirely embodied or supported by one or more suitable software programs or products (or software), which can be stored on or otherwise provided by any kind of non-transitory medium or data carrier, and which might be executed in or by any suitable data processing unit such as an electronic processor-based computing device (or system controller, control unit, etc.) that includes one or more electronic processors and memories. Software programs or routines (e.g., computer-executable or machine-executable instructions or code) can be preferably applied in or by the control device, e.g. a data processing system such as a computer, preferably for executing any of the methods described herein. For example, one embodiment of the present disclosure provides a non-transitory computer-readable medium that includes instructions stored thereon, such that when executed on a processor, the instructions perform the steps of the method of any of the embodiments disclosed herein.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

Figure 1:
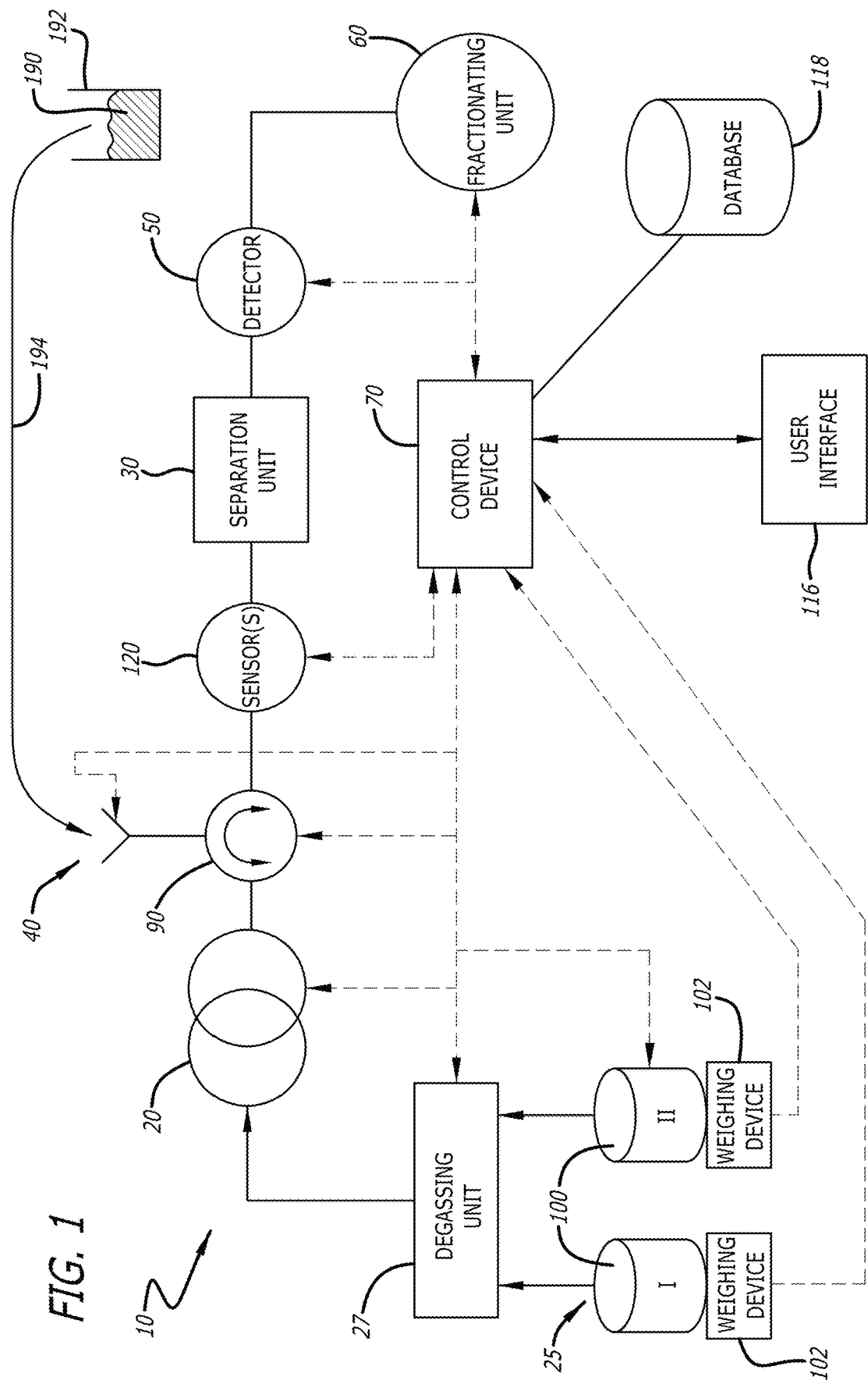
FIG. 1 shows a liquid sample separation apparatus in accordance with embodiments of the present invention, particularly used in high performance liquid chromatography (HPLC).

The illustrations in the drawings are schematic

DETAILED DESCRIPTION

Before describing the figures in further detail, some basic considerations of the present invention will be summarized based on which exemplary embodiments have been developed.

According to an exemplary embodiment of a first aspect of the invention, a control device and method may be provided in which a gross weight of a mobile phase container including mobile phase contained therein as well as an initial fluid volume of the mobile phase in the mobile phase container may be provided and/or determined. Furthermore, the control device and method may determine a characteristic reduction of weight and volume of the mobile phase container during conveying mobile phase from the mobile phase container to the sample separation apparatus. The control device and method may determine (for instance by extrapolation of a determined reduction of the weight and volume of the mobile phase based on a starting point) a tare weight of the empty mobile phase container based on the provided information, and in particular without the need of any additional user input. Corresponding information may be used for controlling operation of the sample separation apparatus for carrying out a separation run using mobile phase in the mobile phase container. Furthermore, the mentioned items of information may allow to identify a mobile phase container, a mobile phase contained in the mobile phase container, a determination of the density of mobile phase in the mobile phase container, etc. Hence, a mobile phase used for separation tasks may be efficiently managed.

In conventional approaches, level sensing of solvent bottles can be made with weight scales. To monitor the relative level, the tare weight of the bottle is however required. In order to predict solvent depletion, the density of the liquid is required as well. Entering the required data can be done conventionally by additional processes executed by a user manually in a conventional workflow. These processes may conventionally reduce productivity and are a source of errors.

According to an exemplary embodiment of the invention, a weight based level sensing may be carried out without the need to manually estimate tare and solvent density. In an embodiment of the invention, it may be sufficient that the user enters only the volume of solvent in the bottle (alternatively even the solvent volume may be determined automatically by the system). During initial operation of a sample separation apparatus (such as a liquid chromatography apparatus), an algorithm may calculate a range of the solvent.

Contrary to conventional approaches, exemplary embodiments of the invention may render is dispensable that a tare value needs to be estimated with an empty bottle. Such a process must be carried out conventionally prior to filling the bottle, which requires an additional transport in the lab between instrument and filling location. If the process is forgotten by a user or a bottle is changed at a filling location, errors may occur. Moreover, it may be conventionally necessary to measure the density of the solvent in case of mixed solvents. Entering the value manually can lead to wrong values and failed analyses.

Exemplary embodiments of the invention may render the described step or transport prior to connecting the filled bottle dispensable. Advantageously, there is no need for a conventional measurement or calibration. A volume value of mobile phase in a mobile phase container may be well known for a user or may be easily readable from level markings on the bottle. Further advantageously, it may be possible to determine an empty weight of the container by a differential weight measurement. An extrapolation of measured values may be carried out for determining an intersection of a graph with an axis.

In a sample separation apparatus (for example an HPLC) comprising at least one mobile phase container (for example a bottle) containing a liquid mobile phase (for example a solvent), a weighing unit (for example scales, etc.) may provide weighing information about the weight of the mobile phase container including the liquid therein. Moreover, a metering device (for instance a pump) may be provided for removing at least a portion of the liquid mobile phase from the mobile phase container. An exemplary embodiment of the invention may combine weighing information concerning the mobile phase container including mobile phase liquid with volume information about an actual volume of liquid mobile phase removed by the metering device from the mobile phase container. A combination of the mentioned items of information may allow to derive additional information about the liquid handling system, in particular a tare weight of the mobile phase container. Such information can include a filling level of the liquid in the container, an accuracy of the metering device, etc. By a differential weight measurement (i.e. the measurement of a weight before and after the removal of a predetermined volume), a conveyed volume or also a density can be determined, wherein the tare weight of a solvent container can be determined by the difference weight measurement in combination with a linear extrapolation. No cumbersome manual pre-measurements are necessary for a user according to such an embodiment.

According to an exemplary embodiment of a second aspect of the invention, a volume of mobile phase which has been really or actually removed out a mobile phase container during operation of a sample separation apparatus over a certain time interval may be experimentally measured in form of actual measurement information. For instance, such a measurement may use a weighing device which measures a weight of the mobile phase container including a remaining mobile phase therein. In addition, the mobile phase volume which has been really or actually conveyed or pumped by a fluid drive (such as an analytical pump of a sample separation apparatus) during a corresponding or the same time interval may be determined as well. The latter mentioned mobile phase volume may be determined on the basis of corresponding values of operation parameters characterizing operation of the fluid drive, such as flow rate, pump pressure, etc. Thereafter, said actually removed mobile phase volume and said actually pumped mobile phase volume may be compared with each other, in particular for determining qualitative or quantitative discrepancies between said volumes. A discrepancy or divergence may indicate artefacts or problems in the sample separation apparatus, in particular concerning operation of the fluid drive (for instance a leakage). Advantageously, the described embodiment compares two actually or really measured parameters, rather than comparing with a target value only. As a consequence, the determined information, in particular concerning a potential discrepancy, is particularly meaningful, as it is a fingerprint of actual conditions in the sample separation apparatus.

Hence, two items of information concerning actual conveyance of mobile phase may be compared, i.e. corresponding information from a measurement device (such as a weighing machine) and conveying information derived from operation parameters of a fluid drive. In case of a determined discrepancy, a corresponding conclusion may be drawn (for instance actual operation parameters may be calculated, a potential issue may be identified, or an appropriate action may be taken).

Still referring to the previously described embodiment, it may use a weight measurement of a mobile phase container for a (in particular permanent) quality monitoring for a solvent delivery module of a sample separation apparatus. Such a quality monitoring may be carried out in terms of installation qualification (IQ) and/or operational qualification (OQ) and/or performance qualification (PQ). In particular, an embodiment may use weight monitoring of solvent consumption for permanent IQ/OQ monitoring of flow and composition accuracy. For example, if by method settings 15 mL have been used in channel A as indicated by a measured weight decrease, but just 10 mL have been pumped by a fluid drive as indicated by an actual flow rate and an actual pressure, it may be concluded that the solvent delivery module is out of specification and needs maintenance.

In conventional approaches, IQ, OQ and/or PQ or instrument performance verification services verify and document the instrument's ability to meet design specifications for performance. IQ/OQ may be important for instruments which operate within a quality management system and follow certain standards, for instance Good Laboratory Practice (GLP). Corresponding tests are usually performed manually and can be complex, time-consuming, involve high effort, and may be challenging to complete. Usually, these tests should be performed on a regular basis to verify the performance of an instrument. For a solvent delivery module, such tests are conventionally done with an external flow meter to verify composition and flow accuracy.

According to exemplary embodiments of the second aspect of the invention, by using a level sensing sensor like a balance under each solvent bottle, the solvent consumption can be accurately tracked and measured. With a comparison of the calculated solvent consumption by an analytical method and a pump configuration and the monitored solvent decrease, the system can check if these parameters match over time. This can be done for instance constantly. If mismatches are discovered in solvent consumption and calculated volume, the system can send out an alarm. Advantageously, no external testing system needs to be installed for an IQ/OQ system check according to the described exemplary embodiments of the invention. In contrast to this, all can be done internally and automatically by the system itself according to preferred embodiments. Moreover, a report and documentation can verify the system performance without the need of manual tests to be carried out in the laboratory with high effort.

According to a description, the volume of mobile phase to be conveyed may be predetermined. If, due to a change in weight after a dispensing process or the sum of dispensing processes, it is determined that the predetermined volume to be conveyed has not been dispensed or deviates too much from it (for instance more than a predefined threshold value), an alarm message may be issued stating for example that too much or too little fluid has been conveyed. After this, subsequent process stages may be adjusted so that the volume to be conveyed is actually dispensed. Advantageously, the mentioned kind of deviations may be determined, and a conclusion may be drawn that the pump may be working erroneously. Still referring to embodiments of the second aspect of the invention, a volume of consumed mobile phase from a mobile phase container determined for example empirically by scales can be compared with a pumped mobile phase volume which can be calculated from a method description in combination with actually determined operation parameter values (such as pressure, flow rate, etc.). Hence, both volumes may be determined empirically by providing a flow meter in addition to scales.

For example, a separation method may describe that a mobile phase volume of 15 mL should be conveyed. Correspondingly, the pump may be controlled with corresponding operation parameters (for instance a flow rate of 5 mL/min for 3 min), and at the same time the weight information concerning actually pumped mobile phase can be measured on a scale or weighing machine. A setpoint may thus be determined by calculating the product of flow rate and time, regardless of which volume the pump actually conveys within the defined time of 3 min. From the measured weight loss, if the density of the liquid mobile phase is pre-known, the actual volume that the pump has conveyed within the time of 3 min can be determined. If a deviation between the two values is determined, this can be an indication of various error states, for example a leakage, a blockage or a mechanical malfunction of the pump. It is advantageous that a sufficient residual volume is in the respective mobile phase container to carry out such a diagnosis.

Referring now in greater detail to the drawings, FIG. 1 depicts a general schematic of a liquid separation system as example for a sample separation apparatus 10 according to an exemplary embodiment of the invention. A fluid drive 20 (such as a piston pump) receives a mobile phase I, II from a solvent supply 25 via degassing unit 27, which degases and thus reduces the amount of dissolved gases in the mobile phase I, II. The fluid drive 20 drives the mobile phase I, II through a separation unit 30 (such as a chromatographic column) comprising a stationary phase. A sampler or injector 40, implementing a fluidic valve 90, can be provided between the fluid drive 20 and the separation unit 30 in order to subject or add (often referred to as sample introduction) a sample fluid into the mobile phase I, II so that a fluidic sample and mobile phase I, II may be provided towards a separation path where actual sample separation occurs. For instance, a fluidic sample 190 may be provided in a sample container 192 (such as a vial) and may be inserted into the injector 40, as shown schematically in FIG. 1 by reference sign 194. The stationary phase of the separation unit 30 is configured for separating compounds of the sample liquid. A detector 50 is provided for detecting separated compounds of the sample fluid. A fractionating unit 60 can be provided for outputting separated compounds of sample fluid. It is also possible to provide a waste (not shown).

While the mobile phase I, II can be comprised of one solvent only, it may also be mixed from plural solvents. Such mixing may be a low pressure mixing and provided upstream of the fluid drive 20, so that the fluid drive 20 already receives and pumps the mixed solvents as the mobile phase. Alternatively, the fluid drive 20 may comprise plural individual pumping units, with plural of the pumping units each receiving and pumping a different solvent or mixture, so that the mixing of the mobile phase I, II (as received by the separation unit 30) occurs at high pressure and downstream of the fluid drive 20 (or as part thereof). The composition of the mobile phase I, II may be kept constant over time, the so called isocratic mode, or varied over time, the so called gradient mode.

A data processing unit or control device 70, which can be a PC or workstation, and which may comprise one or more processors, may be coupled (as indicated by the dotted arrows) to one or more of the devices in the sample separation apparatus 10 in order to receive information and/or control operation. For example, the control device 70 may control operation of the fluid drive 20 (for example setting control parameters) and receive therefrom information regarding the actual working conditions (such as output pressure, etc. at an outlet of the pump). The control device 70 may also control operation of the solvent supply 25 (for example setting the solvent/s or solvent mixture to be supplied) and/or the degassing unit 27 (for example setting control parameters and/or transmitting control commands) and may receive therefrom information regarding the actual working conditions (such as solvent composition supplied over time, vacuum level, etc.). The control device 70 may further control operation of the sampling unit or injector 40 (for example controlling sample injection or synchronization of sample injection with operating conditions of the fluid drive 20). The separation unit 30 may also be controlled by the control device 70 (for example selecting a specific flow path or column, setting operation temperature, etc.), and send—in return—information (for example operating conditions) to the control device 70. Accordingly, the detector 50 may be controlled by the control device 70 (for example with respect to spectral or wavelength settings, setting time constants, start/stop data acquisition), and send information (for example about the detected sample compounds) to the control device 70. The control device 70 may also control operation of the fractionating unit 60 (for example in conjunction with data received from the detector 50) and provide data back.

In the shown embodiment, the solvent supply 25 comprises a first mobile phase container 100 containing a first mobile phase I (for instance distillated water) and a second mobile phase container 100 containing a second mobile phase II (for example an organic solvent such as methanol). Each of the mobile phase containers 100, 100 is placed on a weighing device 102, so that the gross weight of each mobile phase container 100 (i.e. the tare weight of the respective mobile phase container plus the present weight of the mobile phase I or II contained therein) may be measured by the respective weighing device 102 at each point of time. Data indicative of the measured actual gross weight can be transmitted from the weighing device 102 to the control device 70.

Furthermore, a user interface 116 is provided which is coupled with the control device 70. The user interface 116 may allow to input data to the control device 70 (for instance by a touchpad or a number of input buttons), and/or data may be output from the control device 70 to the user (for instance by a display). Via the user interface 116, a user may input data to the control device 70, for instance may input an initial mobile phase volume of mobile phase I, II in a respective mobile phase container 100. For instance, the initial mobile phase volume may be the volume of the respective mobile phase I, II after placing a new completely filled mobile phase container 100 on the sample separation apparatus 10. In this case, the mobile phase volume is usually indicated on a label of the mobile phase container 100. It is however also possible that the initial mobile phase volume is the volume of a respective mobile phase I, II in a respective partially filled mobile phase container 100 prior to the beginning of a separation task using mobile phase I, II in the respective mobile phase container 100 on the sample separation apparatus 10. In this case, the mobile phase volume may be read by a user as a mobile phase level in the respective mobile phase container 100 using a respective scale on the respective mobile phase container 100.

The control device 70 may be coupled to a database 118 in which various data sets may be stored. For instance, content stored in the database 118 may comprise a plurality of chromatographic separation methods, i.e. sets of operation parameters (such as temperature and/or pressure values) and control commands (for instance parameters indicating a gradient profile to be applied during execution of a sample separation run) defined for carrying out a specific assigned sample separation task on the sample separation apparatus 10. It is also possible that database 118 comprises data sets characterizing different mobile phases I, II, III, . . . and/or different mobile phase containers 100. What concerns different mobile phases I, II, III, . . . , said data sets may include information with respect to chemical composition, density, volume-over-weight behavior while pumping the respective mobile phase I, II, III, . . . through the sample separation apparatus 10, etc. What concerns different mobile phase containers 100, said data sets may include information with respect to mobile phase I, II, III, . . . contained therein, mobile phase volume contained therein, size and/or material of a respective mobile phase container 100, etc.

As shown in FIG. 1 as well, one or more sensors 120 may be provided along the flow path of the sample separation apparatus 10. For example, such a sensor 120 may be arranged in or at a conduit between the fluid drive 20 and the sample separation unit 30. Such a sensor 120 may be, for example, a flow rate sensor, a pressure sensor, etc. It is also possible to provide multiple sensors 120 sensing the same or different parameters at different positions along the sample separation apparatus 10.

Figure 2:
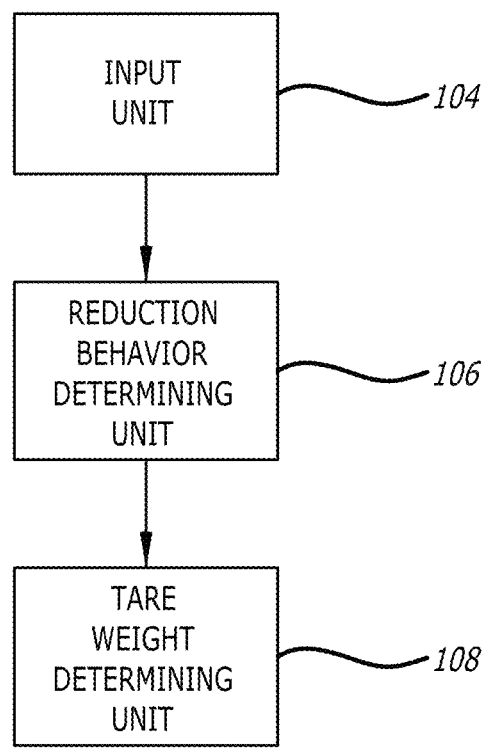
FIG. 2 shows a scheme of a control device for controlling a sample separation apparatus for separating a fluidic sample using a mobile phase provided from at least one mobile phase container according to an exemplary embodiment.

The control device 70 may be configured for controlling operation of the sample separation apparatus 10. Advantageously, the mobile phase I, II from the mobile phase containers 100 may be used as carrier fluid for carrying the fluidic sample during sample separation by liquid chromatography (LC). Additionally or alternatively, a control device 70 may also be configured for carrying out or controlling one of the methods described in the following referring to FIG. 2 to FIG. 7:

FIG. 2 shows a scheme of a control device 70 for controlling a sample separation apparatus 10 for separating a fluidic sample using a mobile phase I, II provided from at least one mobile phase container 100 according to an exemplary embodiment.

According to FIG. 2, control device 70 comprises an input unit 104 for providing gross weight information indicative of an initial gross weight of a mobile phase container 100 and volume information indicative of an initial mobile phase volume in the mobile phase container 100. For instance, the initial gross weight of the mobile phase container 100 may be its tare weight plus the weight of the mobile phase I, II contained in the respective mobile phase container 100. This weight may correspond to an initial point of time, for instance when a fresh and completely filled mobile phase container 100 is installed in sample separation apparatus 10, or when a sample separation run shall be started with an already installed and for instance only partially filled mobile phase container 100. The volume information may correspond to a liquid volume of mobile phase I, II contained in the respective mobile phase 100 at said initial point of time. For example, the gross weight may be measured by weighing machine 102. For instance, the initial mobile phase volume may be read by a user from the mobile phase container 100 and may be input to the control device 70 via user interface 116.

As can be taken from FIG. 2 as well, control device 70 may furthermore comprise a reduction behavior determining unit 106 for determining a weight and volume reduction behavior according to which weight and volume of mobile phase in the mobile phase container 100 are reduced during conveying mobile phase from the mobile phase container 100 in the sample separation apparatus 10. During operation of the sample separation apparatus 10, fluid drive 20 may pump mobile phase I, II from mobile phase containers 100 through the flow path shown in FIG. 1. Hence, mobile phase I, II is consumed, so that volume and weight of the mobile phase I, II in the mobile phase containers 100 are successively reduced. A corresponding characteristic can be reflected by the mentioned weight and volume reduction behavior. Information used for this purpose may be provided in form of time-dependent data from the weighing machine 102, from flow rate sensor 120, etc.

Beyond this, control device 70 comprises a tare weight determining unit 108 for determining a tare weight of the mobile phase container 100 based on the provided gross weight information, the provided volume information, and the determined weight and volume reduction behavior. For instance, the tare weight may be estimated by extrapolating the weight and volume reduction behavior starting from an initial gross weight and volume data point.

Details of the operation according to FIG. 2 will be explained below referring to FIG. 4 and FIG. 5.

Figure 3:
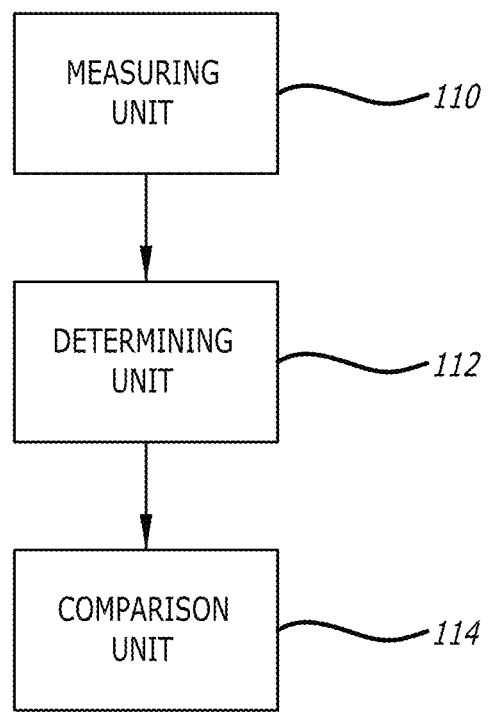
FIG. 3 shows a scheme of a control device for controlling a sample separation apparatus for separating a fluidic sample using a mobile phase according to another exemplary embodiment.

FIG. 3 shows a scheme of a control device 70 for controlling a sample separation apparatus 10 for separating a fluidic sample using a mobile phase according to another exemplary embodiment.

According to the embodiment of FIG. 3, the control device 70 comprises a measuring unit 110 for measuring, at a respective mobile phase container 100 providing the mobile phase I, II, actual measurement information indicative of conveyance of the mobile phase during operating the sample separation apparatus 10. More specifically, actual measurement information may be obtained by measuring over time a weight of the mobile phase container 100 and mobile phase I, II therein. Information used for this purpose may be provided in form of time-dependent data from the weighing machine 102. This indicates which amount of mobile phase I, II is in fact removed out of the respective mobile phase container 100.

Beyond this, the control device 70 comprises a determining unit 112 for determining, based on at least one operation parameter of operating the sample separation apparatus 10, actual operation information indicative of conveyance of the mobile phase I, II by fluid drive 20 during operating the sample separation apparatus 10. More specifically, flow rate and conveyance time according to which the mobile phase I, II is driven from the respective mobile phase container 100 through the sample separation apparatus 10 may be used as operation parameters for determining the actual operation information. For instance, the operation parameter may be the flow rate of the conveyed mobile phase I, II, as detected by sensor 120. Thus, information used for this purpose may be provided in form of time-dependent data from the sensor 120. This indicates which amount of mobile phase I, II is in fact pumped or conveyed by fluid drive 20.

Apart from this, the control device 70 comprises a comparison unit 114 for comparing the actual measurement information and the actual operation information for deriving a conclusion. If the sample separation apparatus 10 works properly, the amount of mobile phase I, II which is actually removed from the mobile phase containers 100 and measured by the measuring unit 110, and the amount of mobile phase I, II which is actually pumped by the fluid drive 20 and determined by the determining unit 112 are identical. This corresponds to a scenario in which the entire mobile phase I, II leaving the mobile phase containers 100 is pumped by fluid drive 20 up to and beyond sensor 120. If however a leak is present in the sample separation apparatus 10 (for instance at the fluid drive 20) or if another artifact occurs, the amount of mobile phase I, II measured by the measuring unit 110 may be larger or smaller than the amount of mobile phase I, II determined by the determining unit 112, wherein a difference between these values is due to the leakage or other kind of artifact. Hence, a discrepancy between the mentioned two actual values may allow to drive a conclusion in terms of controlling the sample separation apparatus 10 by the control device 70 taking into account said discrepancy.

For example, a conclusion of the comparison unit 114 may be that the fluid drive 20 of the sample separation apparatus 10 for driving the mobile phase I, II has a leakage issue in case of the described discrepancy between the actual measurement information and the actual operation information. As conclusion, the comparison unit 114 may also determine an actual value of at least one operation parameter obtained when bringing the actual measurement information in accordance with the actual operation information. According to yet another embodiment, a drawn conclusion may be whether or not the sample separation apparatus 10 complies with a predefined specification by analyzing the discrepancy between the actual measurement information and the actual operation information. For instance, it may be determined whether the identified leakage is still acceptable, i.e. is still within a specification, or is no longer acceptable, i.e. is out of a specification.

Figure 4:
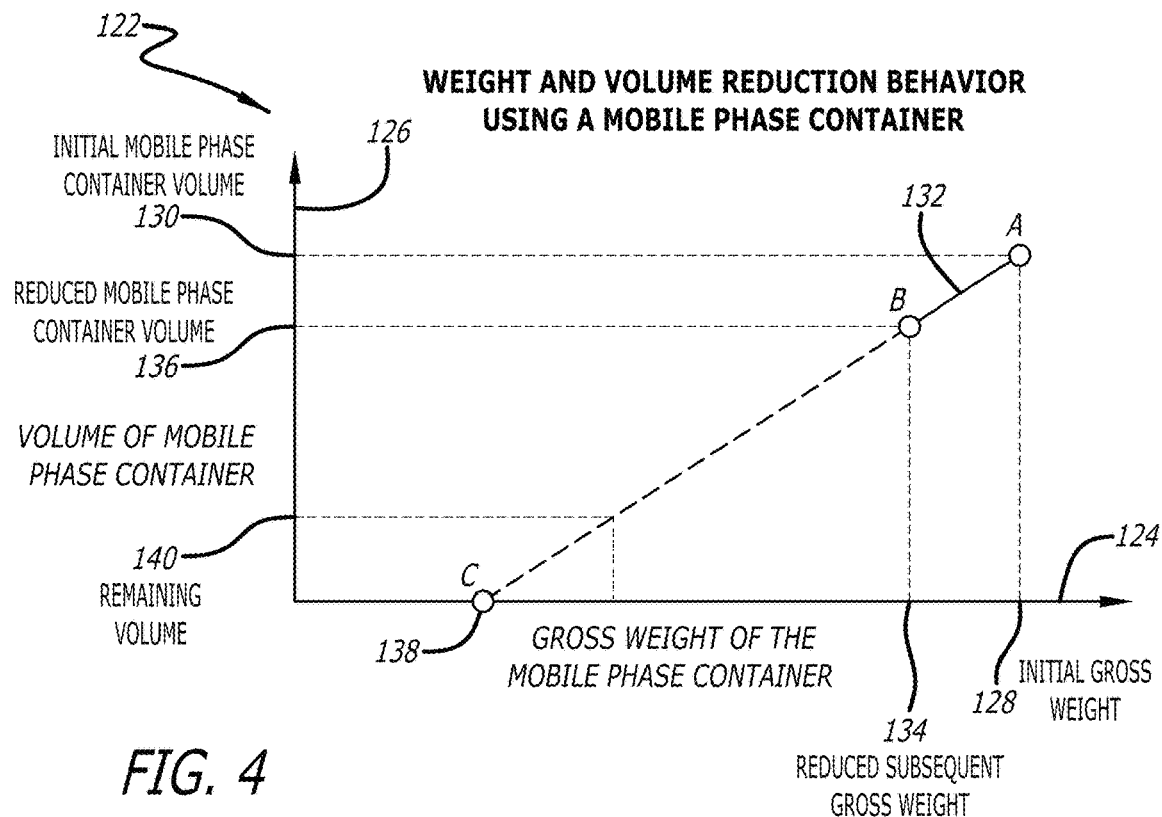
FIG. 4 shows a diagram illustrating a method of controlling a sample separation apparatus for separating a fluidic sample using a mobile phase provided from at least one mobile phase container according to an exemplary embodiment.

FIG. 4 shows a diagram 122 illustrating a method of controlling a sample separation apparatus 10 for separating a fluidic sample using a mobile phase I, II provided from at least one mobile phase container 100 according to an exemplary embodiment.

Along an abscissa 124 of diagram 122, a weight of a mobile phase container 100 including its mobile phase I, II is plotted, i.e. a gross weight of the mobile phase container 100. Along an ordinate 126 of diagram 122, a volume of mobile phase I, II in a respective mobile phase container 100 is plotted. Letter A indicates an initial value for volume and measured weight. Letter B indicates a value for volume and measured weight after some time of operation of sample separation apparatus 10 with non-solvent composition. Letter C indicates a further value for volume and measured weight extrapolated to the tare weight when the respective mobile phase container 100 is empty, i.e. when no mobile phase I, II is any longer contained within said mobile phase container 100.

Diagram 122 relates to, referring to letter A, the process of providing gross weight information indicative of an initial gross weight 128 of a mobile phase container 100 and volume information indicative of an initial mobile phase volume 130 in the mobile phase container 100. For instance, the gross weight information indicating gross weight 128 of the mobile phase container 100 may be measured by weighing machine 102. Furthermore, the initial mobile phase volume 130 may be input by a user via user interface 116. Alternatively, the initial mobile phase volume 130 may be determined automatically by the control device 70, which will be described below referring to FIG. 5. For instance, when a filled mobile phase container 100 (embodied as a liquid bottle) is positioned on the weighing machine 102, the weight is measured and the user can be asked for the volume via user interface 116. This gives the data point according to letter A in the diagram 122.

Furthermore, diagram 122 relates to, referring to reference sign 132, the process of determining a weight and volume reduction behavior according to which weight and volume of mobile phase I, II in the mobile phase container 100 are reduced during conveying mobile phase I, II from the respective mobile phase container 100 through the sample separation apparatus 10. Measuring the weight reduction behavior may be performed by the weighing machine 102. The changing mobile phase volume 130 may be input by a user via user interface 116 or may be determined automatically by the control device 70. Further additionally or alternatively, the reduction of the mobile phase volume in the respective mobile phase container 100 over time may be determined using information measured by the flow rate sensor 120 over a certain time interval. By any of the described operations, a further data point in diagram 122 corresponding to letter B may be obtained, which indicates a reduced subsequent gross weight 134 of a respective mobile phase container 100 and volume information indicative of a meanwhile reduced mobile phase volume 136 in the mobile phase container 100. Starting from the data point according to letter A, the sample separation apparatus 10 may be primed or starts with a defined operation. Consequently, some known volume (as derived from the metering of the HPLC pump or fluid drive 20) of the solvent is consumed and a new weight is measured. This gives the further data point according to a letter B in the diagram 122.

For determining tare weight 138 of the mobile phase container 100 based on the provided gross weight information according to reference sign 128, the provided volume information according to reference sign 130, and the determined weight and volume reduction behavior according to reference sign 132, the linear section corresponding to reference sign 132 may be extrapolated in a linear way until it intersects with the abscissa 124 of the diagram 122. The result, corresponding to letter C, indicates the tare weight 138 of the empty mobile phase container 100. For example, a software or firmware executed by a processor of control device 70 may extrapolate the linear section according to reference sign 132 to a zero volume left (corresponding to letter C). This extrapolation gives the weight of the empty bottle which is equivalent to tare.

Based on the determined tare weight 138, control device 70 may precisely control the sample separation apparatus 10 in terms of mobile phase management.

More precisely, it may be possible to determine the tare weight 138 by extrapolating the weight and volume reduction behavior according to reference sign 132 starting from the initial gross weight 128 and the initial mobile phase volume 130 up to a zero volume of mobile phase I, II in the respective mobile phase container 100 corresponding to reference sign 138.

It is also possible that the process executed by control device 70 predicts, based on the provided gross weight information according to reference sign 128, the provided volume information according to reference sign 130, and the determined weight and volume reduction behavior according to reference sign 132, a point of time at which a volume 140 of remaining mobile phase I, II in the respective mobile phase container 100 falls below a predefined threshold value of for example 20% (or another first warning level) or 10% (or another second warning level) of the initial mobile phase volume 130 in the previously entirely filled mobile phase container 100. By taking this measure, the control device 70 may determine a point of time at which the mobile phase level in the respective mobile phase container 100 falls below a critical value.

Additionally or alternatively, the control device 70 may also be configured for carrying out a calculation for predicting, based on the provided gross weight information according to reference sign 128, the provided volume information according to reference sign 130, and the determined weight and volume reduction behavior according to reference sign 132, whether the mobile phase I, II in the mobile phase container 100 is sufficient for carrying out a predefined separation run for separating the fluidic sample by the sample separation apparatus 10. Descriptively speaking, the control device 70 may also determine whether the available mobile phase I, II is sufficient for completing an intended separation run. By taking this measure, it may be reliably prevented that a mobile phase container 100 runs out of mobile phase I, II during a separation run, and hence runs dry.

When the control device 70 has completed the calculations concerning the determination of the tare weight (see reference sign 138) of a mobile phase container 100, the control device 70 may proceed with a control of the sample separation apparatus 10 with a mobile phase management taking into account the results of the calculations. The control device 70 may furthermore take one or more additional actions. One possible action is to invite a user to provide an additional amount of mobile phase I and/or II sufficient for completing the predefined separation run, when the calculation leads to the result that the presently available amount of mobile phase I, II is not sufficient for carrying out an intended separation run. If a separation run has already started, but the calculation shows that the available amount of mobile phase I, II is insufficient for properly completing said run, the control device 70 may stop the separation run and may inform a user accordingly via user interface 116. If the calculation shows that the available amount of mobile phase I, II is insufficient for a planned but not yet started separation run, the control device 70 may also disable execution of the predefined separation run until sufficient mobile phase I, II for completing the predefined separation run has been provided by a user (for instance an additional mobile phase container 100 has been installed by the user on the sample separation apparatus 10.

Again referring to the diagram 122 of FIG. 4, the control device 70 may also determine a density of the mobile phase I, II based on the determined weight and volume reduction behavior in accordance with reference sign 132. More specifically, a gradient of the linear curve according to reference sign 132 of the determined weight and volume reduction behavior may be indicative of the density of a respective mobile phase I, II.

Figure 5:
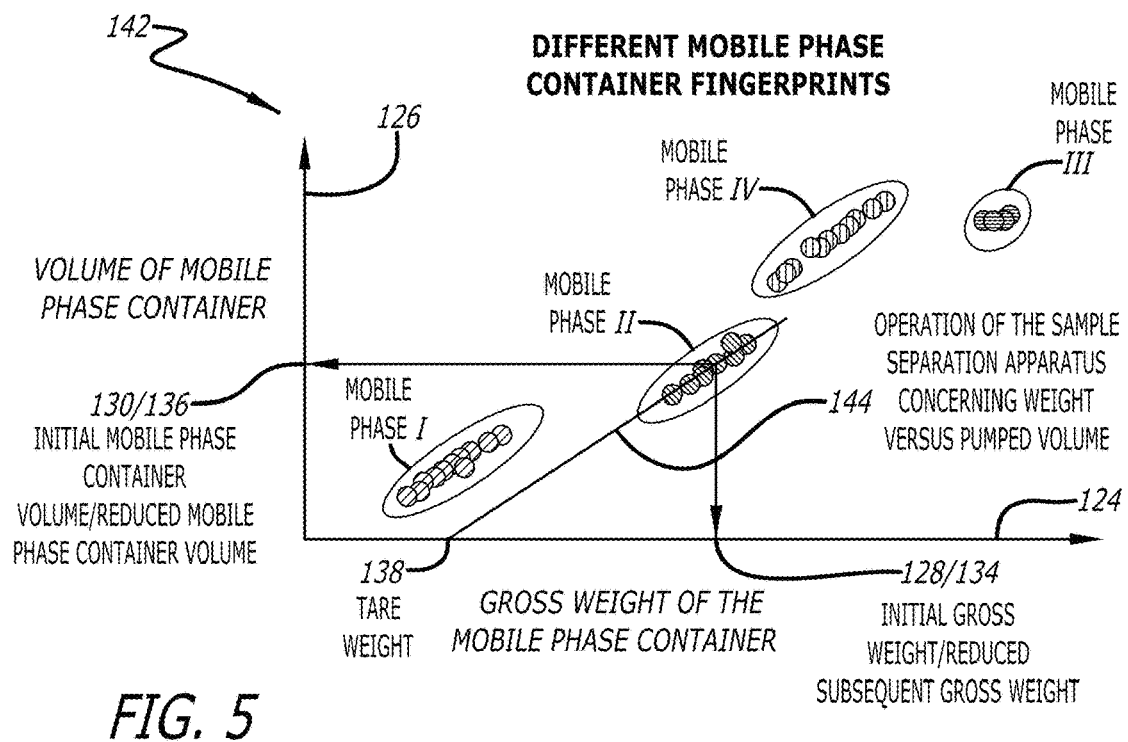
FIG. 5 shows another diagram illustrating a method of controlling a sample separation apparatus for separating a fluidic sample using a mobile phase provided from at least one mobile phase container according to an exemplary embodiment.

FIG. 5 shows another diagram 142 illustrating a method of controlling a sample separation apparatus 10 for separating a fluidic sample using a respective mobile phase I, II, III, IV provided from at least one mobile phase container 100 according to an exemplary embodiment.

In accordance with what has been described above referring to FIG. 4, a plurality of data points have been determined for mobile phases I, II, III, IV in different types of mobile phase containers 100 according to a FIG. 5. More specifically, mobile phase I in a corresponding mobile phase container 100 describes a certain mobile phase in a small light bottle, for instance made of polyethylene and having a volume of 500 mL. Mobile phase II in a corresponding mobile phase container 100 describes a mobile phase in a medium-size bottle, for instance made of glass and having a volume of 1000 mL. Mobile phase III in a corresponding mobile phase container 100 describes a mobile phase in a large-size bottle, for instance made of glass and having a volume of 2000 mL. Mobile phase IV in a corresponding mobile phase container 100 describes a mobile phase in a lighter large-size bottle, for instance made of polyethylene and having a volume of 2000 mL. As can be taken from FIG. 5, the fingerprint of the different mobile phase containers 100 in diagram 142 is different and characteristic for each type of mobile phase container 100. In other words, each type of mobile phase container 100 with assigned mobile phase I, II, III, IV belongs to a respective one of multiple clusters shown as ellipses in FIG. 5.

Thus, capturing one or more data points for a certain mobile phase container 100 and comparing an obtained characteristic with the different reference data points of diagram 142 allows to identify an unknown mobile phase container 100 in accordance with a best match criterion. For instance, it may be determined to which of the clusters the unknown mobile phase container 100 fits best. In other words, a mobile phase container identification may be carried out based on a comparison of determined weight and volume characteristics (for instance any of the properties shown in FIG. 4) with the pre-known reference weight and volume characteristics of the different types of reference mobile phase containers of FIG. 5 with pre-known identity. Data sets with pre-known reference weight and volume characteristics of the different reference mobile phase containers may be stored in database 118 shown in FIG. 1. Furthermore, it may be possible to automatically determine the initial mobile phase volume of a respective mobile phase container 100 based on a comparison of a weight and volume characteristic 132 with the pre-known reference weight and volume characteristics of reference mobile phase containers with pre-known initial mobile phase volume.

Correspondingly, it may be possible to identify an unknown mobile phase I, II, III or IV based on a comparison of its determined weight and volume reduction behavior 132 with pre-known reference weight and volume reduction behavior of one or more reference mobile phase materials with pre-known identity. Since each mobile phase I, II, III or IV may have a characteristic gradient corresponding to reference sign 132 in accordance with its density, an automatic identification of a present mobile phase I, II, III or IV may be possible correspondingly.

Referring to FIG. 5 more specifically, a line 144 may be derived from the operation of the sample separation apparatus 10 concerning weight versus pumped volume. Line 144 is characteristic for solvent or mobile phase II. Hence, solvent density may be determined automatically, although it is also possible to set the density by a user input.

For the example of mobile phase II, FIG. 5 indicates a tare weight, see reference sign 138. The tare or tare weight 138 of a mobile phase container 100 may show small variations, which causes the distribution on the weight axis, i.e. abscissa 124. A mobile phase container 100 may have variable filling levels, which causes a distribution along line 144. Different bottle types belong to different clusters. A data set may be updated continuously to changes in the bottle tare volume or change in weight of tubing, filters or caps.

In the example of FIG. 5, four different types of mobile phase containers 100 have been used. Each data point of FIG. 5 may be obtained when conveying mobile phase I, II, III, IV out of a respective one of the mobile phase containers 100. The clusters indicated in FIG. 5 show that each type of mobile phase container 100 has a characteristic pattern, which allows an automatic detection or identification of an unknown mobile phase container 100 by assigning an unknown mobile phase container 100 to the best fitting cluster according to FIG. 5. Hence, the system may determine automatically which type of mobile phase container 100 is present. The system may also determine automatically the initial volume of mobile phase I, II, III, IV in a certain mobile phase container 100. Thus, the shown system is capable of automatically identifying a mobile phase container 110 and an initial mobile phase volume thereof. Elements of artificial intelligence may be implemented in such a system. By training the system, for instance on the basis of user input initial volume values, the system may improve continuously over time. An educated guess of tare may be made by the system. For instance, it is also possible that the system outputs an educated guess to a user concerning an initial volume, which the user can confirm or reject. This helps, in turn, for further training the system.

Figure 6:
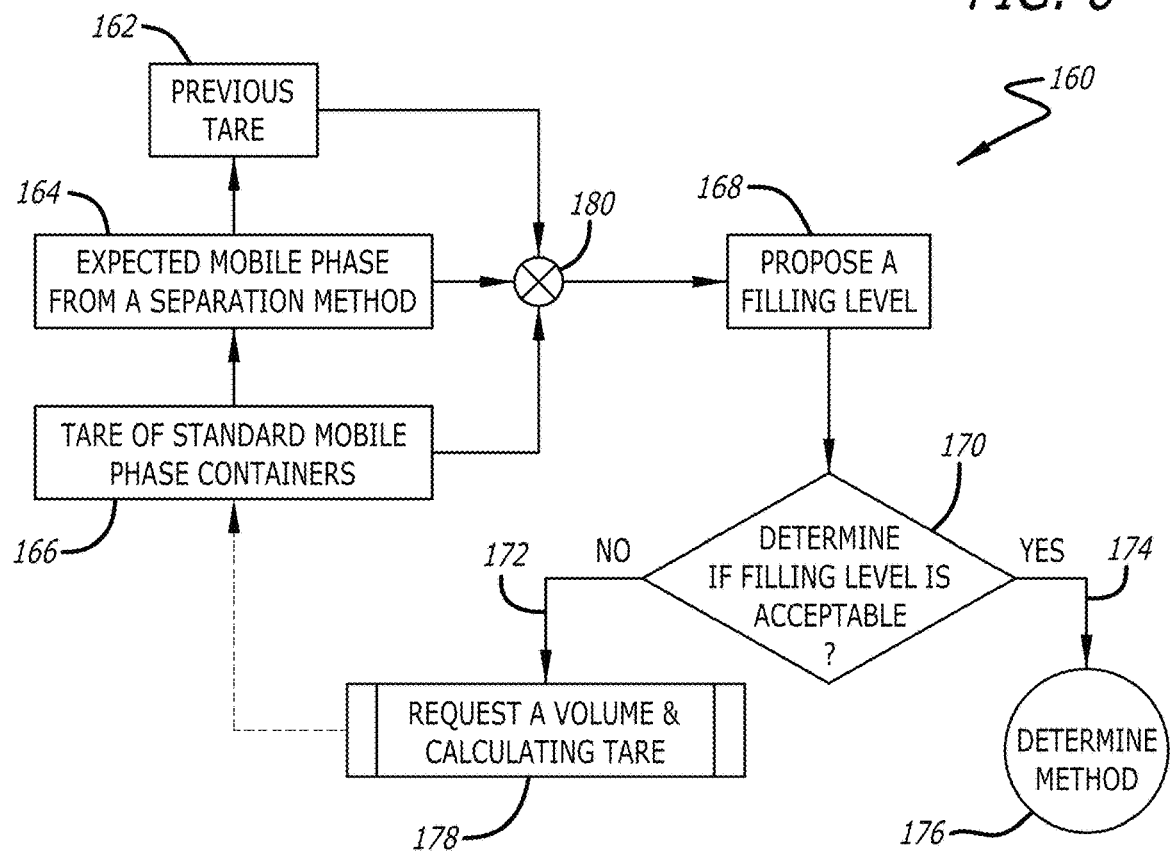
FIG. 6 shows a flowchart indicating level sensing with balance according to an exemplary embodiment.

FIG. 6 shows a flowchart 160 indicating a workflow concerning level sensing with balance according to an exemplary embodiment which may avoid to manually tare. The method described referring to FIG. 6 is based on an educated and learning guess concept.

A previous tare (see block 162), an expected mobile phase from a separation method (see block 164) and a tare of standard mobile phase containers (see block 166) may be used as multiple inputs and may be combined in a combining unit 180. As indicated by block 168, this may allow to propose a filling level. In a block 170, a check may be made whether the proposed filling level is acceptable. If yes (see reference sign 174), the method is terminated (see block 176). If no (see reference sign 172), the method proceeds with requesting a volume and calculating tare (see block 178). The result may be fed back to blocks 162, 164, 166, respectively.

Figure 7:
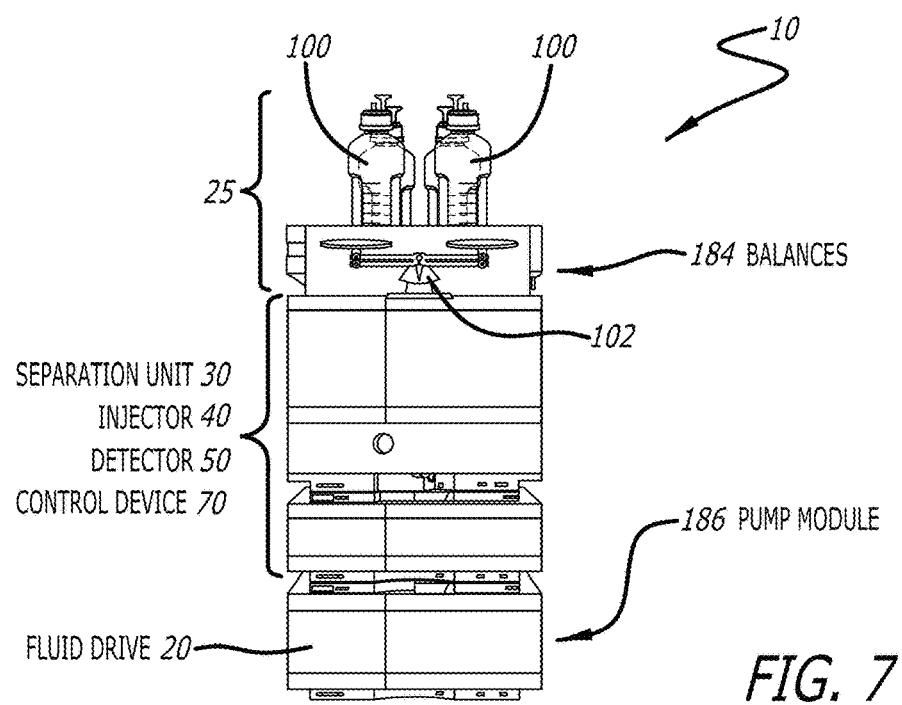
FIG. 7 shows a sample separation apparatus according to an exemplary embodiment of the invention.

FIG. 7 shows a sample separation apparatus 10 according to another exemplary embodiment of the invention.

The embodiment of FIG. 7 may correspond to the above-described embodiment of FIG. 3. A sample separation apparatus 10 embodied as modular HPLC is shown in FIG. 7. Different mobile phase containers 100 are placed on top of the modular tower-type sample separation apparatus 10 on a weighing machine 102. As indicated by reference sign 184, balances may be included in the solvent tray under each mobile phase container 100 embodied as solvent bottle. As indicated by reference sign 186, the shown pump module (corresponding to fluid drive 20 in FIG. 1) may measure the solvents' consumption individually for each mobile phase.

A mismatch may be discovered between, on the one hand, the actual weight decrease of the mobile phase containers 100 as measured by the weighing machine 102, and, on the other hand, actual mobile phase consumption in accordance with the fluid drive operation of the fluid drive 20. An amount of a potential discrepancy between actual weight decrease of mobile phase containers 100 and actual mobile phase consumption by fluid drive 20 may be used for determining a performance indicator indicating a performance of the sample separation apparatus 10. More specifically, such a discrepancy can be used for an IQ/OQ testing to verify the performance of the fluid drive 20.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the control device 70 schematically depicted in FIGS. 1-3 and 7. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), application specific integrated circuits (ASICs), or field-programmable gate arrays (FPGAs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the control device 70 schematically depicted in FIGS. 1-3 and 7), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

The invention claimed is:

1. A method for controlling a sample separation apparatus for separating a fluidic sample using a mobile phase provided from at least one mobile phase container, the method comprising:
   determining a weight and volume reduction behavior according to which weight and volume of mobile phase in a mobile phase container of the at least one mobile phase container are reduced during conveying mobile phase from the mobile phase container of the at least one mobile phase container in the sample separation apparatus; and
   determining a tare weight of the mobile phase container of the at least one mobile phase container based on a gross weight information, a volume information, and the determined weight and volume reduction behavior, wherein the gross weight information is indicative of an initial gross weight of the mobile phase container of the at least one mobile phase container including mobile phase of the mobile phase container of the at least one mobile phase container and the volume information is indicative of an initial mobile phase volume in the mobile phase container of the at least one mobile phase container.

2. The method according to claim 1, comprising at least one of the following features:
   controlling the sample separation apparatus based on a result of the determining;
   controlling the sample separation apparatus based on the determined tare weight.

3. The method according to claim 1, comprising at least one of the following features:
   measuring the gross weight information and/or the weight reduction behavior;
   receiving the gross weight information from a user input;
   determining the gross weight information based on at least one of an assumption, an experience, or a previous measurement.

4. The method according to claim 1, comprising receiving the initial mobile phase volume from a user input.

5. The method according to claim 1, comprising determining the initial mobile phase volume based on a comparison of a weight and volume characteristic of the mobile phase container of the at least one mobile phase container with a pre-known reference weight and volume characteristic of one or more reference mobile phase containers of the at least one mobile phase container with pre-known initial mobile phase volume.

6. The method according to claim 1, comprising identifying the mobile phase container of the at least one mobile phase container based on a comparison of a weight and volume characteristic of the mobile phase container of the at least one mobile phase container with a pre-known reference weight and volume characteristic of one or more reference mobile phase containers of the at least one mobile phase container with pre-known identity.

7. The method according to claim 1, comprising identifying the mobile phase based on a comparison of the determined weight and volume reduction behavior with pre-known reference weight and volume reduction behavior of one or more reference mobile phase materials with pre-known identity.

8. The method according to claim 1, comprising determining the tare weight by extrapolating the weight and volume reduction behavior starting from the initial gross weight and the initial mobile phase volume.

9. The method according to claim 1, comprising predicting, based on the provided gross weight information, the provided volume information, and the determined weight and volume reduction behavior, a point of time at which a remaining amount of mobile phase in the mobile phase container of the at least one mobile phase container falls below a predefined threshold value.

10. The method according to claim 1, comprising predicting, based on the provided gross weight information, the provided volume information, and the determined weight and volume reduction behavior, whether the mobile phase in the mobile phase container of the at least one mobile phase container is sufficient for carrying out a predefined separation run for separating the fluidic sample by the sample separation apparatus using the mobile phase.

11. The method according to claim 10, comprising taking an action in accordance with a result of the prediction, wherein the action is at least one action selected from the group consisting of: inviting a user to provide additional mobile phase sufficient for completing the predefined separation run; warning the user that a provided amount of mobile phase is insufficient for completing the predefined separation run; stopping the separation run upon predicting that remaining mobile phase is insufficient for completing the predefined separation run; and disabling execution of the predefined separation run until sufficient mobile phase for executing the entire predefined separation run has been provided.

12. The method according to claim 1, comprising determining a density of the mobile phase based on the determined weight and volume reduction behavior.

13. The method according to claim 1, comprising determining the weight and volume reduction behavior under consideration of a flow rate and a conveyance time according to which the mobile phase is driven from the at least one mobile phase container of the at least one mobile phase container through the sample separation apparatus.

14. The method according to claim 1, comprising at least one of the following features:
   determining the weight and volume reduction behavior under consideration of a repeated measurement of the gross weight information and/or the weight reduction behavior;
   using the mobile phase from the at least one mobile phase container as carrier fluid for carrying the fluidic sample during sample separation.

15. A control device for controlling a sample separation apparatus for separating a fluidic sample using a mobile phase provided from at least one mobile phase container, the control device comprising:
   an input unit for inputting gross weight information indicative of an initial gross weight of a mobile phase container of the at least one mobile phase container including its mobile phase of the mobile phase container of the at least one mobile phase container and volume information indicative of an initial mobile phase volume in the mobile phase container of the at least one mobile phase container;

a reduction behavior determining unit for determining a weight and volume reduction behavior according to which weight and volume of mobile phase in the mobile phase container of the at least one mobile phase container are reduced during conveying mobile phase from the mobile phase container of the at least one mobile phase container in the sample separation apparatus; and a tare weight determining unit for determining a tare weight of the mobile phase container of the at least one mobile phase container based on the gross weight information, the volume information, and the determined weight and volume reduction behavior.

16. A sample separation apparatus for separating a fluidic sample, wherein the sample separation apparatus comprises:

a fluid drive for driving a mobile phase, provided from at least one mobile phase container of the at least one mobile phase container, and the fluidic sample when injected in the mobile phase;

a sample separation unit for separating the fluidic sample in the mobile phase; and the control device according to claim 15.

17. The sample separation apparatus according to claim 16, wherein the sample separation apparatus comprises at least one of the following features:

the sample separation apparatus is configured as a chromatography sample separation apparatus;

the sample separation apparatus comprises a detector configured to detect the separated fluidic sample;

the sample separation apparatus comprises a fractioner unit configured to collect separated fractions of the fluidic sample;

the sample separation apparatus comprises an injector configured to inject the fluidic sample in the mobile phase.

* * * * *